United States Patent [19]

Hattori et al.

[11] 4,211,194
[45] Jul. 8, 1980

[54] IGNITION SYSTEM FOR INTERNAL COMBUSTION ENGINES

[75] Inventors: Tadashi Hattori, Okazaki; Daisaku Sawada, Susono; Kenji Goto, Susono; Takashi Shigematu, Susono; Yuji Takeda, Susono; Hiroaki Yamaguchi, Aichi; Minoru Nishida, Okazaki, all of Japan

[73] Assignees: Nippon Soken, Inc., Nishio; Toyota Jidosha Kogyo Kabushiki Kaisha, Toyota, both of Japan

[21] Appl. No.: 847,812

[22] Filed: Nov. 2, 1977

[30] Foreign Application Priority Data

Nov. 10, 1976 [JP] Japan .............................. 51/135501
Nov. 11, 1976 [JP] Japan .............................. 135548

[51] Int. Cl.² ........................................................ F02P 5/04
[52] U.S. Cl. ....................... 123/417; 123/425, 123/6.5
[58] Field of Search ........ 123/117 R, 117 D, 146.5 A, 123/148 E, 119 ED; 73/35

[56] References Cited

U.S. PATENT DOCUMENTS

| 2,220,558 | 11/1940 | Van Dijck et al. | 123/117 R |
|---|---|---|---|
| 3,678,732 | 7/1972 | Arrigoni et al. | 73/35 |
| 3,874,351 | 4/1975 | Asler et al. | 123/117 R |
| 3,875,912 | 4/1975 | Bullo | 123/117 R |
| 3,890,944 | 6/1975 | Werner et al. | 123/117 R |
| 3,957,023 | 5/1976 | Peterson | 123/117 D |
| 4,002,155 | 1/1977 | Harned et al. | 123/148 E |
| 4,054,111 | 10/1977 | Sand | 123/117 D |
| 4,061,116 | 12/1977 | Saida et al. | 123/117 D |
| 4,063,538 | 12/1977 | Powell et al. | 123/148 E |
| 4,100,895 | 7/1978 | Hattori et al. | 123/117 R |
| 4,106,447 | 8/1978 | West | 123/148 E |
| 4,131,097 | 12/1978 | Sawada et al. | 123/117 R |
| 4,153,019 | 5/1979 | Laubenstein et al. | 123/117 D |

FOREIGN PATENT DOCUMENTS

| 2221503 | 11/1973 | Fed. Rep. of Germany | 123/117 R |
|---|---|---|---|
| 2412487 | 9/1975 | Fed. Rep. of Germany | 123/117 R |
| 2616095 | 10/1976 | Fed. Rep. of Germany | 123/117 R |

*Primary Examiner*—Charles J. Myhre
*Assistant Examiner*—Andrew M. Dolinar
*Attorney, Agent, or Firm*—Cushman, Darby & Cushman

[57] ABSTRACT

An ignition system for an internal combustion engine comprises knock detecting means for detecting knocking of the engine, and ignition timing control means for controlling the ignition timing of the engine in response to the presence or absence of the knocking condition. The knock detecting means detects the pressure in the cylinders of the engine to detect the occurrence of knocking by the fact that the detected pressure includes a high frequency pressure variation. The ignition timing control means is responsive to the output of the knock detecting means, whereby as long as no knocking is detected the ignition timing is controlled to provide the minimum advance for best torque (MBT) and ensure improved engine power efficiency and fuel consumption, whereas when knocking is detected the ignition timing is retarded in relation to the minimum advance for maximum torque (MBT) to prevent the engine from knocking.

2 Claims, 15 Drawing Figures

IGNITION SYSTEM FOR INTERNAL COMBUSTION ENGINES

BACKGROUND OF THE INVENTION

The present invention relates to an ignition system for internal combustion engines of the type in which the ignition timing is automatically retarded upon occurrence of knocking in the engine, and more particularly this invention relates to such ignition system in which knocking of the engine is detected by the presence of a high frequency pressure variation in the cylinder pressure, whereby the ignition timing is retarded in relation to MBT only when knocking is detected, and in other circumstances the ignition timing is always controlled at around MBT.

The ignition timing of an internal combustion engine must be determined in accordance with the conditions of the engine to ensure optimum operation of the engine. In the past, ignition timing control systems have been generally designed so that the engine speed and intake manifold vacuum are respectively detected by the centrifugal advance mechanism and vacuum advance mechanism so as to represent the engine conditions and thereby determine the ignition timing. And it has been generally believed that in consideration of the engine efficiency and fuel consumption, the best results can be obtained if ignition occurs at around a so-called minimum advance for best torque or MBT, and consequently the ignition timing must be changed to MBT depending on the engine conditions.

Under certain engine conditions, however, advancing the ignition timing around the MBT causes knocking and thus preventing stable operation of the engine. FIGS. 1(A) and 1(B) show the relation between MBT and the knocking limit, and the FIGS. show that the knocking limit is reached before MBT at low speed and low load operations. Also the knocking limit tends to be affected by the atmospheric conditions, e.g., temperature and humidity, and the existing ignition timing control systems are programmed to considerably retard the ignition timing in relation to MBT throughout the range of the engine operating conditions in accordance with the engine speed and intake manifold vacuum parameters. As a result, the power output and fuel consumption are held lower than the performance of the engine. Thus, it is desirable that the ignition timing is controlled at around MBT as long as the engine is not knocking and that the ignition timing is then retarded around MBT only when knocking is caused.

It is generally known that there exists a close correlation between the ignition timing and the cylinder pressure, and the experiments conducted under various conditions on the ratio between the maximum value (hereinafter referred to as a Pmax) of the cylinder pressure obtained when the mixture was exploded and the maximum pressure value (hereinafter referred to as a Pm) obtained under the motoring conditions in which the engine was operated by the motor without exploding the mixture in the cylinders, i.e., the ratio Pmax/Pm, showed that the ratio Pmax/Pm tended to increase as the ignition timing was advanced, and that when the ignition timing was maintained at MBT, the ratio Pmax/Pm was held practically the same irrespective of the parameters, such as, the engine speed, intake manifold pressure, etc., as shown in FIG. 6. (Though not shown in the Figure, the ratio was held practically constant irrespective of the engine cooling water temperature, oil temperature, etc.) It will thus be seen that if the ignition timing of the engine is controlled so as to maintain the ratio Pmax/Pm constant, the ignition timing will be controlled at around MBT. In this case, since it is impossible to detect Pm for the actual control, the ratio Pmax/Pm is detected by detecting the pressure Pi obtained at a fixed angle Ka before the maximum advance angle in FIG. 7 to represent Pm, whereby when the ratio is smaller than a predetermined value, the ignition timing is advanced, whereas when the ratio is greater than the predetermined value, the ignition timing is retarded, thereby maintaining the ignition timing at around MBT independently of the operating conditions of the engine.

SUMMARY OF THE INVENTION

It is an object of this invention to detect knocking of an internal combustion engine for automatically retarding the ignition timing.

It is another object of this invention to detect knocking of an engine by the presence of high frequency pressure variation in the engine cylinder pressure for automatically retarding the ignition timing.

It is still another object of this invention to always control the ignition timing at around MBT in response to the pressures in the engine cylinders so long as no knocking of the engine is detected.

DESCRIPTION OF THE PREFERRED EMBODIMENTS

Figure 1:
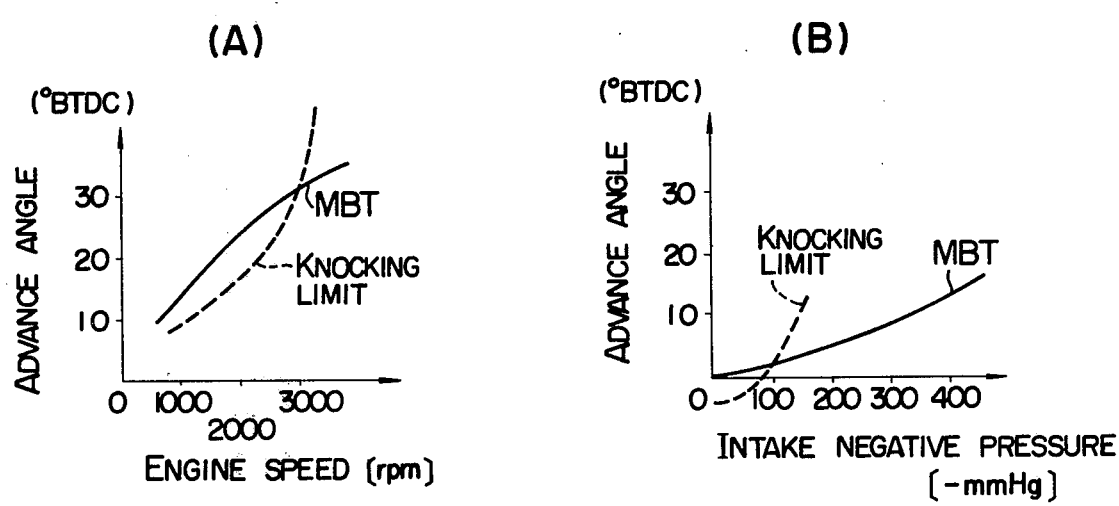
FIGS. 1(A) and 1(B) are ignition timing characteristic diagrams respectively showing the relation between the engine speed and MBT and knocking limit and the relation between the intake negative pressure and MBT and knocking limit.

The first embodiment of the invention shown in FIGS. 2 to 5 of the accompanying drawings and the second embodiment shown in FIGS. 8 to 15 will now be described. In the drawings, the same reference numerals designate the same or equivalent parts.

Figure 2:
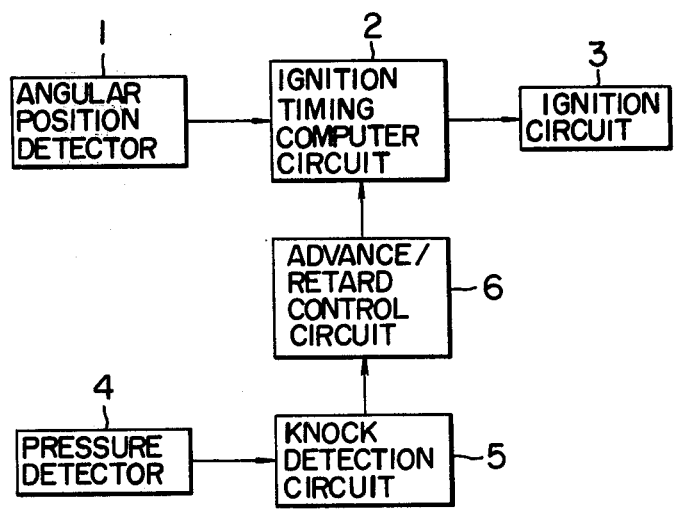
FIG. 2 is a block diagram showing a first embodiment of the present invention.

Referring first to FIG. 2 showing a general construction of the first embodiment, numeral 1 designates an angular position detector for detecting two angular positions of the crankshaft of a four-cylinder, fourcycle internal combustion engine, 2 an ignition timing computer circuit responsive to the signals from the angular position detector 1 for initiating the charging and discharging of a capacitor and computing an advance angle, whereby in accordance with the engine parameters detected by engine condition detectors which are not shown, the charge and discharge currents of the capacitor are changed to thereby determine the desired ignition timing. Numeral 3 designates an ignition circuit responsive to the signals from the ignition timing computer circuit 2 for generating ignition sparks. Numeral 4 designates a pressure detector for detecting the pressure in the cylinders of the engine, 5 a knock detection circuit for detecting knocking in accordance with the signal from the pressure detector 4, and 6 an advance/retard control circuit for controlling the computation of the ignition timing computer circuit 2 to control the ignition timing. The angular position detector 1, the ignition timing computer circuit 2 and the advance/retard control circuit 6 form ignition timing control means, and the pressure detector 4 and the knock detection circuit 5 constitute knock detecting means.

The construction of the angular position detector 1 and the ignition timing computer circuit 2 shown in FIG. 2 will now be described in detail with reference to FIG. 3. In the angular position detector 1, numeral 11 designates a rotor having four projections arranged at equal spacing on the periphery thereof and fixedly mounted on the distributor shaft of the engine which is not shown for rotation therewith. Numerals 12 and 13 designate first and second electromagnetic pickups which are arranged in the circumferential direction of the rotor 11 and displaced from each other by a predetermined angle so as to be opposite to the projections on the rotor 11. Numerals 16 and 17 designate transistors which are respectively connected to the electromagnetic pickups 12 asnd 13, and 14 and 15 resistors. Numerals 18 and 19 designate NAND circuits constituting a flip-flop circuit having its one input connected to the collector of the transistor 16 and its other input connected to the collector of the transistor 17. The rotor 11 rotates once in the direction of the arrow for every two revolutions of the crankshaft, and the electromagnetic pickups 12 and 13 generate signals which go negative as shown in (a$_1$) and (a$_2$) of FIG. 5 at angles M$_1$ and M$_2$ at which each of the projections passes the electromagnetic pickups 12 and 13. Consequently, the electromagnetic pickups 12 and 13 detect the angular positions M$_1$ and M$_2$ of the crankshaft for each cylinder. When a negative signal is generated in each of the electromagnetic pickups 12 and 13, the transistors 16 and 17 are turned on. With the transistors 16 and 17 turned on, the flip-flop comprising the NAND circuits 18 and 19 comes into operation, thus generating at its one output terminal b the waveform shown in (b) of FIG. 5 and having a time width inversely proportional to the engine speed. The output d of the ignition timing computer circuit 2 is applied to the ignition circuit 3.

In the ignition timing computer circuit 2, resistors 220 and 221 and a capacitor 222 provide a reference potential Vref which is coupled to each of the below-mentioned operational amplifiers through a bias resistor. The ignition timing computer circuit 2 also comprises a NOT circuit 21, a discharge control circuit 22, analog switches 23, 24 and 29 each of which is turned on by a "1" level signal, a charge resistor 25, a discharge resistor 26, bias resistors 27 and 212 connected to the reference potential Vref, an input resistor 211, operational amplifiers 28 and 213, a capacitor 210 and an AND circuit 214. The resistors 25, 26 and 27, the capacitor 210 and the operational amplifier 28 constitute a Miller integrator circuit, whereby when the input voltage is lower than the reference potential Vref, the capacitor 210 is charged, whereas when the input voltage is higher than the reference potential Vref, the capacitor 210 is discharged. The resistors 211 and 212 and the operational amplifier 213 constitutes a comparison circuit. Each of the analog switches 23, 24 and 29 may advantageously comprise a field-effect transistor. Numeral 10 designates a key switch, 11 a battery constituting a power source, KS a supply terminal connected to the positive side of the power source 11 through the key switch 10, and GND a ground terminal connected to the negative side of the battery 11.

The construction of the pressure detector 4, the knock detection circuit 5 and the advance/retard control circuit 6 will now be described in detail with reference to FIG. 4.

The pressure detector 4 may comprise a piezoelectric transducer or the like which detects the pressure in the engine cylinders. The output of the pressure detector 4 is applied to the knock detection circuit 5. The knock detection circuit 5 comprises a differentiation circuit including an operational amplifier 53, a resistor 52 and a capacitor 51, a comparator including resistors 54 and 55 and an operational amplifier 56, a band-pass filter including resistors 58, 510, 512, 514 and 515, capacitors 59 and 511 and an operational amplifier 513, a comparator including resistors 516 and 517 and an operational amplifier 518, monostable multivibrator circuits 57 and 519 each adapted to be triggered in response to the positive going transition of the comparator output, NOT circuits 520, 523 and 524, and AND circuits 521 and 522. The advance/retard control circuit 6 comprises resistors 61, 62 and 66, analog switches 63 and 64, and an operational amplifier 67, and one end of the resistor 61 is connected to the reference potential Vref.

Next, the operation of the embodiment described in detail above as well as the engine operating conditions will now be described with reference to FIG. 5. The angular position detector 1 generates rectangular pulses in synchronism with the rotation of the engine crankshaft which is not shown, namely, an output is generated at the output terminal b which goes to the "1" level during the time interval between M$_1$ and M$_2$ and which goes to the "0" level during the time interval between M$_2$ and M$_1$ as shown in (b) of FIG. 5, and the output generated consists of two pulses, two periods per revolution of the engine. When the output of the angular position detector 1 goes to the "1" level, the analog switch 23 is turned on. At this time, the output of the NOT circuit 21 goes to the "0" level so that the analog switch 24 is turned off, and the output signal of the AND circuit 214 goes to the "0" level thus turning the analog switch 29 off. Consequently, the capacitor 210 is charged from the reference potential Vref in response to the output of the advance/retard control circuit 6 starting at the point of $M_1$ as shown in (c) of FIG. 5. This charging of the capacitor 210 causes the output of the opertional amplifier 28 to become higher than the reference potential Vref, and the output of the comparison circuit goes to the "0" level as shown in (d) of FIG. 5.

Figure 5:
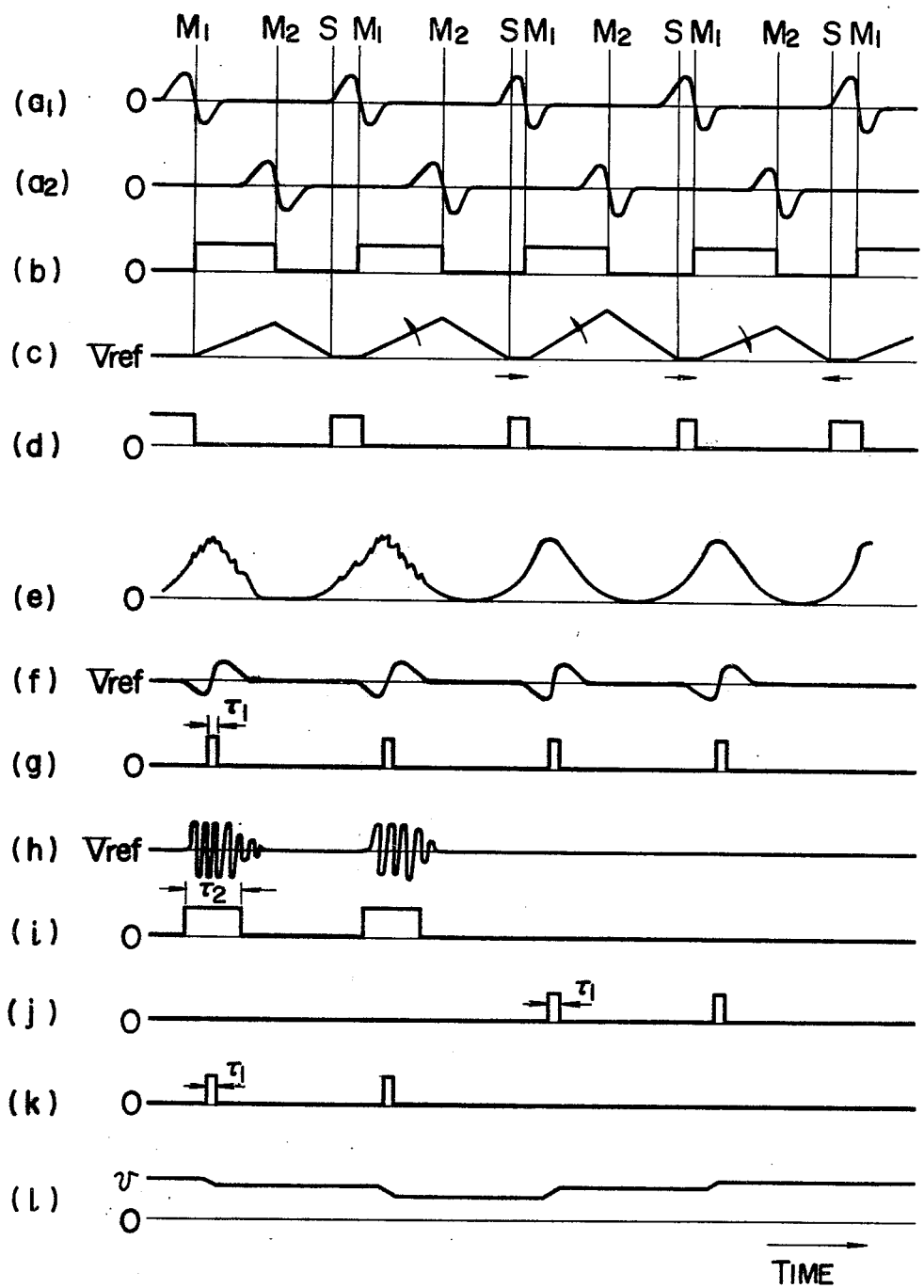
FIG. 5 is a time chart showing waveforms which are useful for explaining the operation of the first embodiment shown in FIGS. 3 and 4.
Figure 6:
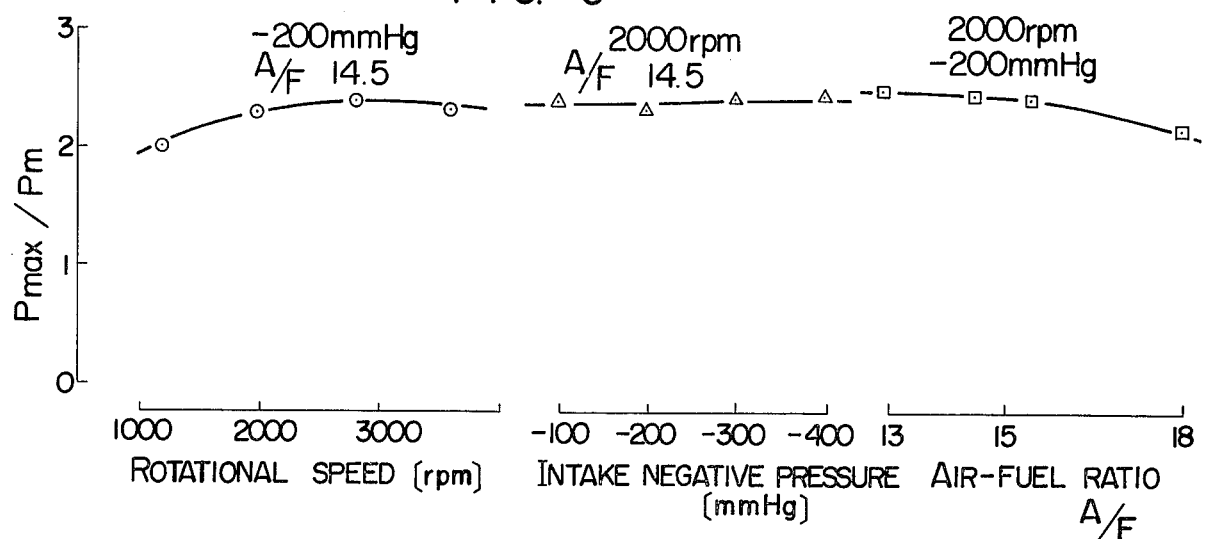
FIG. 6 is a diagram showing the relation between the pressure ratio (Pmax/Pm) and the engine rotational speed, intake negative pressure and air-fuel ratio at MBT.
Figure 7:
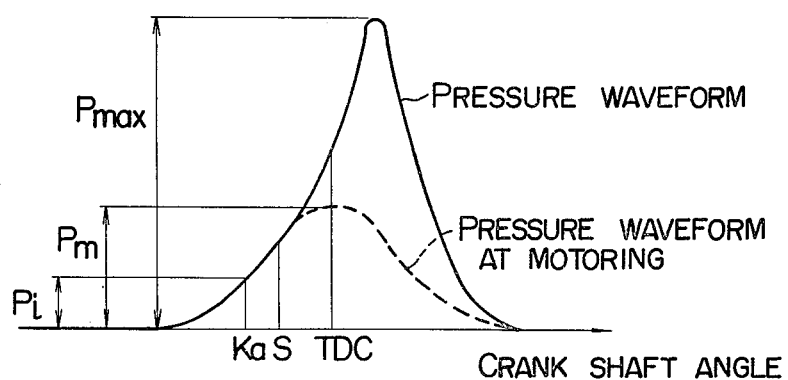
FIG. 7 is a characteristic diagram showing variations of the pressure in the cylinder of the engine.

Then, as the signal at the output terminal b of the angular position detector 1 goes to the "0" level, the analog switch 23 is turned off and simultaneously the analog switch 24 is turned on, thus causing the capacitor 210 to start discharging at the discharge current corresponding to the output of the discharge control circuit 22 as shown in (c) of FIG. 5. In this embodiment, it is so programmed that the output of the discharge control circuit 22 varies in response to the engine conditions. When the discharge of the capacitor 210 is completed so that the output of the operational amplifier 28 becomes lower than the reference potential Vref, the output of the comparison circuit changes to the "1" level as shown in (d) of FIG. 5 and the output of the AND circuit 214 goes to the "1" level, thus causing the analog switch 29 to be turned on and thereby maintaining the output of the operational amplifier 28 at the reference potential Vref as shown in (c) of FIG. 5. The resulting signal at the output terminal d of the ignition timing computer circuit 2 is applied to the ignition circuit 3 which in turn produces an ignition spark in response to the positive going transition of the input signal.

On the other hand, the pressure waveform derived by the pressure detector 4 as shown in (e) of FIG. 5 is applied to the differentiation circuit and the band-pass filter circuit in the knock detection circuit 5. The resulting output f of the differentiation circuit becomes equal to the reference potential Vref at the peak position of the pressure waveform as shown in (f) of FIG. 5, and consequently if the divided potential of the resistors 54 and 55 is selected equal to the reference potential Vref, the output of the operational amplifier 56 applied to the monostable multivibrator circuit 57 takes the form of a signal which goes to the "1" level at the peak position of the pressure waveform, and the resulting output g of the monostable multivibrator circuit 57 takes the form of a monostable output having a time width $\tau_1$ which begins at the peak position of the pressure waveform as shown in (g) of FIG. 5. The band-pass filter is prearranged so that it passes only the frequency components of 5 to 10 KHz caused by knocking and much higher than those generated at the maximum engine speed (6,000 rpm), and the resulting output h of the band-pass filter is such that as shown in (h) of FIG. 5 a high frequency component is detected upon occurrence of knocking, and the output h is held at the reference potential Vref when there is no knocking. The output h of the band-pass filter is applied to the comparator so that when the output h is higher than the divided potential of the resistors 516 and 517, the output of the operational amplifier 518 goes to the "1" level. Consequently, when knocking is caused so that a high frequency output is detected in the output h, the monostable multivibrator circuit 519 generates, only upon occurrence of knocking, as its output a mono-stable pulse having a time width $\tau_2$ as shown in (i) of FIG. 5. Here the time width $\tau_2$ is preselected greater than the output time width $\tau_1$ of the mono-stable multivibrator circuit 57. The outputs g and i of the monostable multivibrator circuits 57 and 519 are applied to the NAND circuit 521 whose output is in turn applied to the NOT circuit 523, with the result that the NOT circuit 523 generates as its output k a pulse of the time width $\tau_1$ as shown in (k) of FIG. 5 only when knocking is caused. On the other hand, the output i is applied to the NOT circuit 520 whose output is in turn applied, along with the output g, to the NAND circuit 522 whose output is in turn applied to the NOT circuit 524, with the result that as shown in (j) of FIG. 5 the NOT circuit 524 generates as its output j a pulse of the time width $\tau_1$ only when there is no knocking.

The outputs j and k of the knock detection circuit 5 are selectively applied to the advance/retard control circuit 6, so that when there is no knocking, the analog switch 63 is turned on for the duration of $\tau_1$ and the capacitor 65 is charged by the divided potential v of the resistors 61 and 62. Consequently, the terminal voltage of the capacitor 65 is increased to the potential v and the output l of the operational amplifier 67 constituting a voltage follower circuit also is increased to the potential v. Thus, the output l of the advance/retard control circuit 6 is held at the constant value v, with the result that the output c of the integrator circuit of the ignition timing computer circuit 2 is determined by the charge current which is constant and the discharge current which varies in accordance with the engine conditions, and consequently the ignition timing is determined by the preliminarily programmed output of the discharge control circuit 22. On the contrary, when knocking occurs, the analog switch 63 is turned off and the analog switch 64 is turned on, so that the charge in the capacitor 65 is discharged through the resistor 66 and the output l of the advance/retard control circuit 6 drops below the potential v as shown in (l) of FIG. 5. This increases the charge current for the capacitor 210 in the integrator circuit of the ignition timing computer circuit 2 and the ignition timing is retarded. When the ignition timing is retarded so that there is no longer any knocking, the analog switch 63 is turned on and the capacitor 65 is again charged, thus advancing the ignition timing. It will thus be seen that the ignition timing is retarded in response to the occurrence of knocking, and when there is no longer any knocking the ignition timing is advanced, thus controlling the ignition timing at a spark advance which avoids knocking.

While, in the embodiment described above, the control of ignition retard by the detection of knocking is accomplished by controlling the capacitor charging in the ignition timing computer circuit, it is possible to accomplish this by controlling the capacitor discharging. Further, while, in the above-mentioned embodiment, the ignition timing computer circuit is of the analog type in which the computation of ignition timing is accomplished through charge and discharge of the capacitor, it is possible to use any other type, e.g., digital type of ignition timing computer circuit. Still further, while, in the above-mentioned embodiment, the ignition timing is controlled electronically, the control may be accomplished mechanically. In this case, the ignition timing may be retarded by moving the breaker points through a motor, solenoid or the like in response to the occurrence of knocking. Still further, while, in the above-mentioned embodiment, the cylinder pressure is detected to detect the occurrence of knocking by the presence of high frequency component in the cylinder pressure, it is possible, for example, to detect vibration of the engine to detect the occurrence of knocking by the presence of particular frequency component in the vibration.

Figure 8:
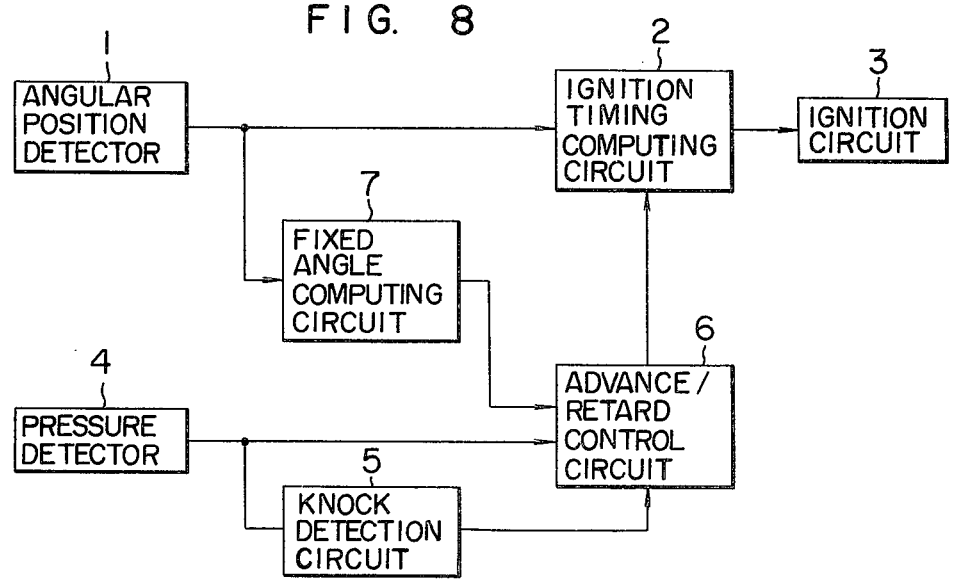
FIG. 8 is a block diagram showing a second embodiment of the invention.

The second embodiment shown in FIG. 8 is designed to always control the ignition timing exactly at the minimum advance for best torque (MBT), and it differs from the first embodiment in that there is further provided a fixed angle computer circuit 7 which is responsive to the output signal of the angular position detector 1 to compute the fixed angle Ka in the similar manner as the ignition timing computer circuit 2 and that the advance/retard control circuit 6 is designed to receive, in addition to the signal from the knock detection circuit 5, the signals from the pressure detector 4 and the fixed angle computer circuit 7 to compute the value of Pmax/Pm and thereby control the ignition timing computer circuit 2.

Figure 3:
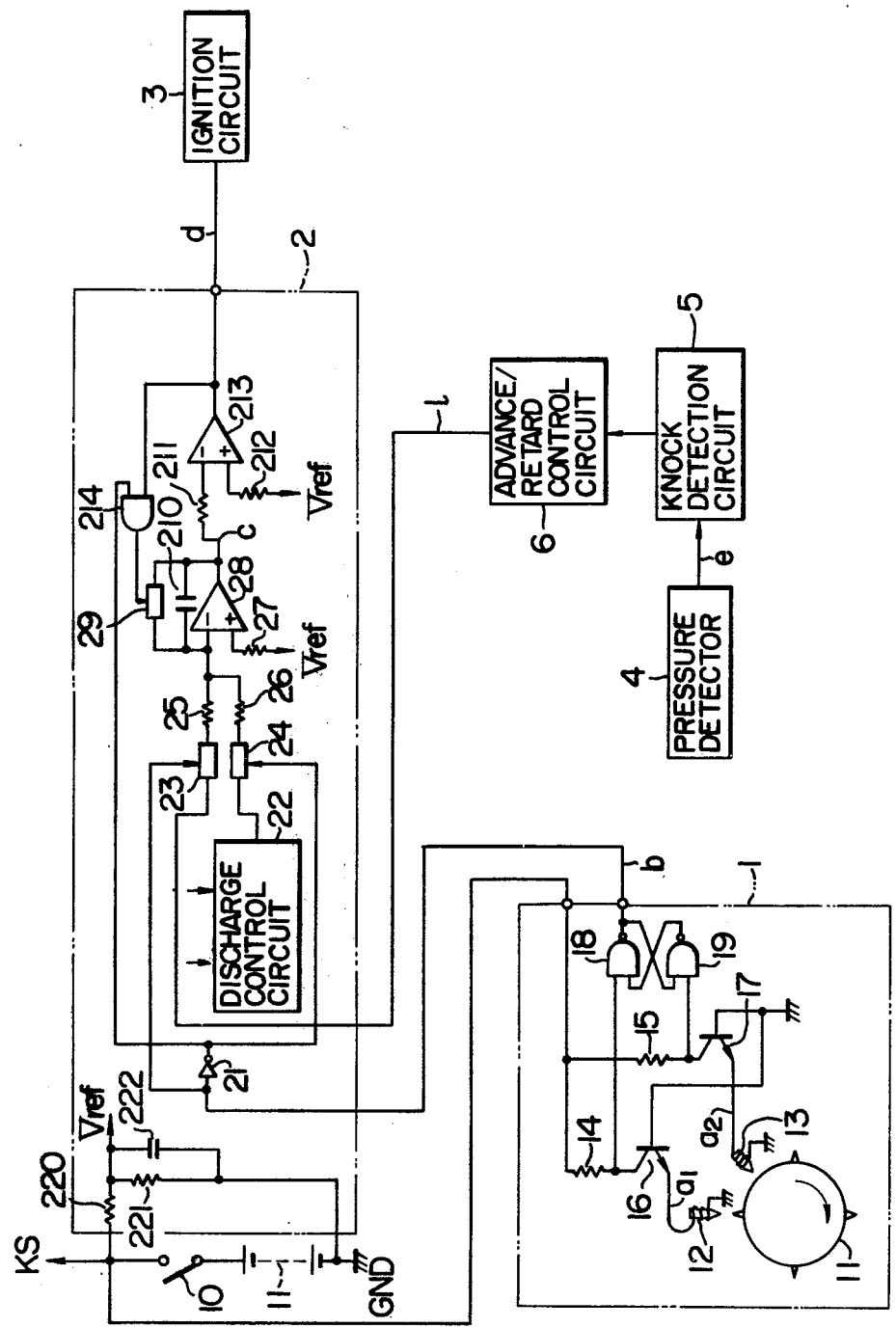
FIG. 3 is a wiring diagram showing a detailed construction of a part of the first embodiment shown in FIG. 2.
Figure 9:
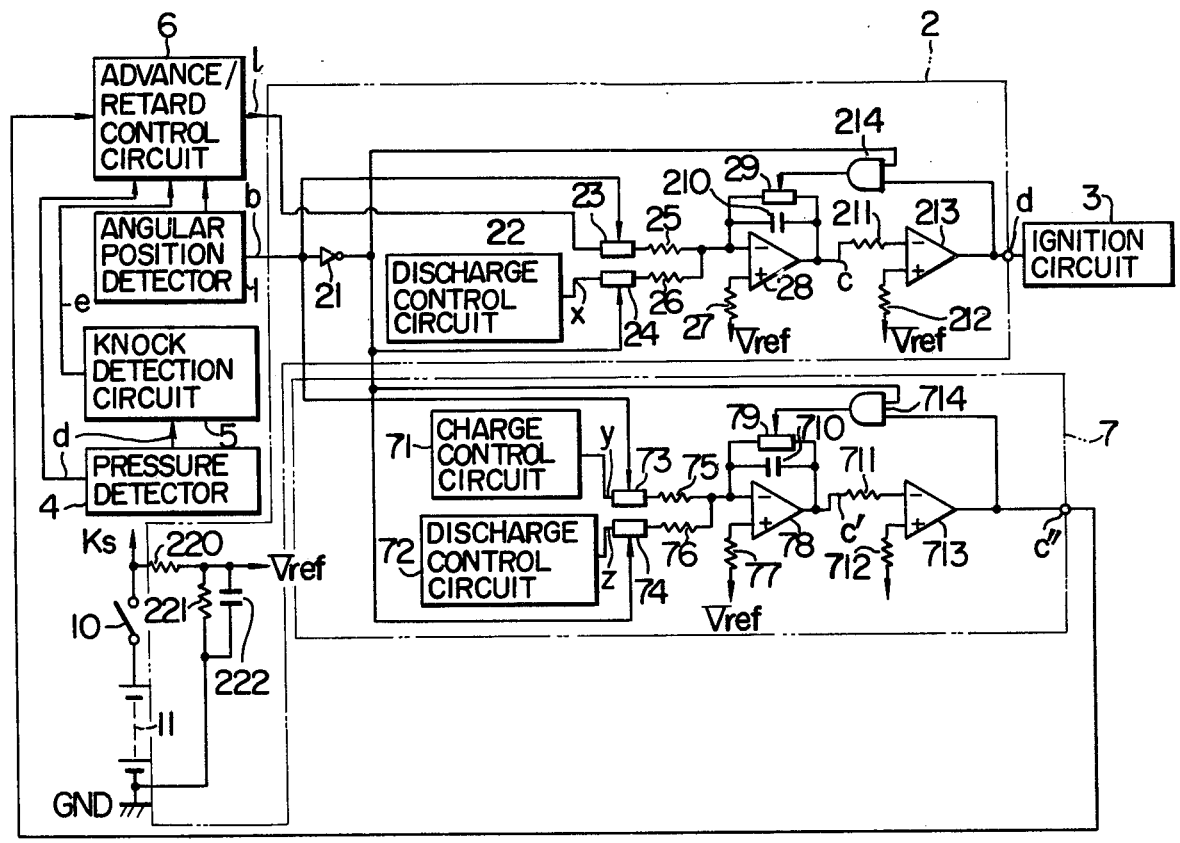
FIGS. 9, 10 and 11 are wiring diagrams respectively showing a detailed construction of the principal parts of the second embodiment of FIG. 8.

Referring now to FIG. 9 showing in detail the construction of the ignition timing computer circuit 2 and the fixed angle computer circuit 7, the ignition timing computer circuit 2 is identical in construction with the counterpart in the first embodiment shown in FIG. 3. The fixed angle computer circuit 7 comprises a charge control circuit 71, a discharge control circuit 72, analog switches 73, 74 and 79 each of which is turned on by a "1" level signal, a charge resistor 75, a discharge resistor 76, bias resistors 77 and 712 connected to the reference potential Vref, operational amplifiers 78 and 713, a capacitor 710 and an AND circuit 714.

Figure 10:
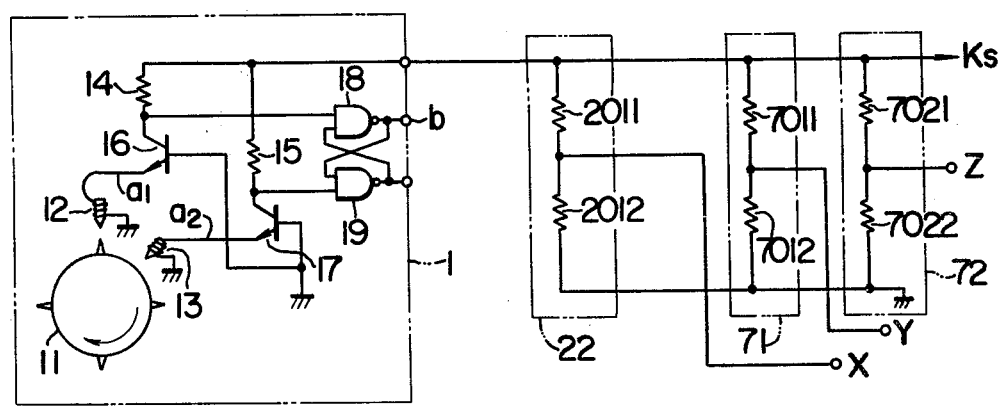
Figure 11:
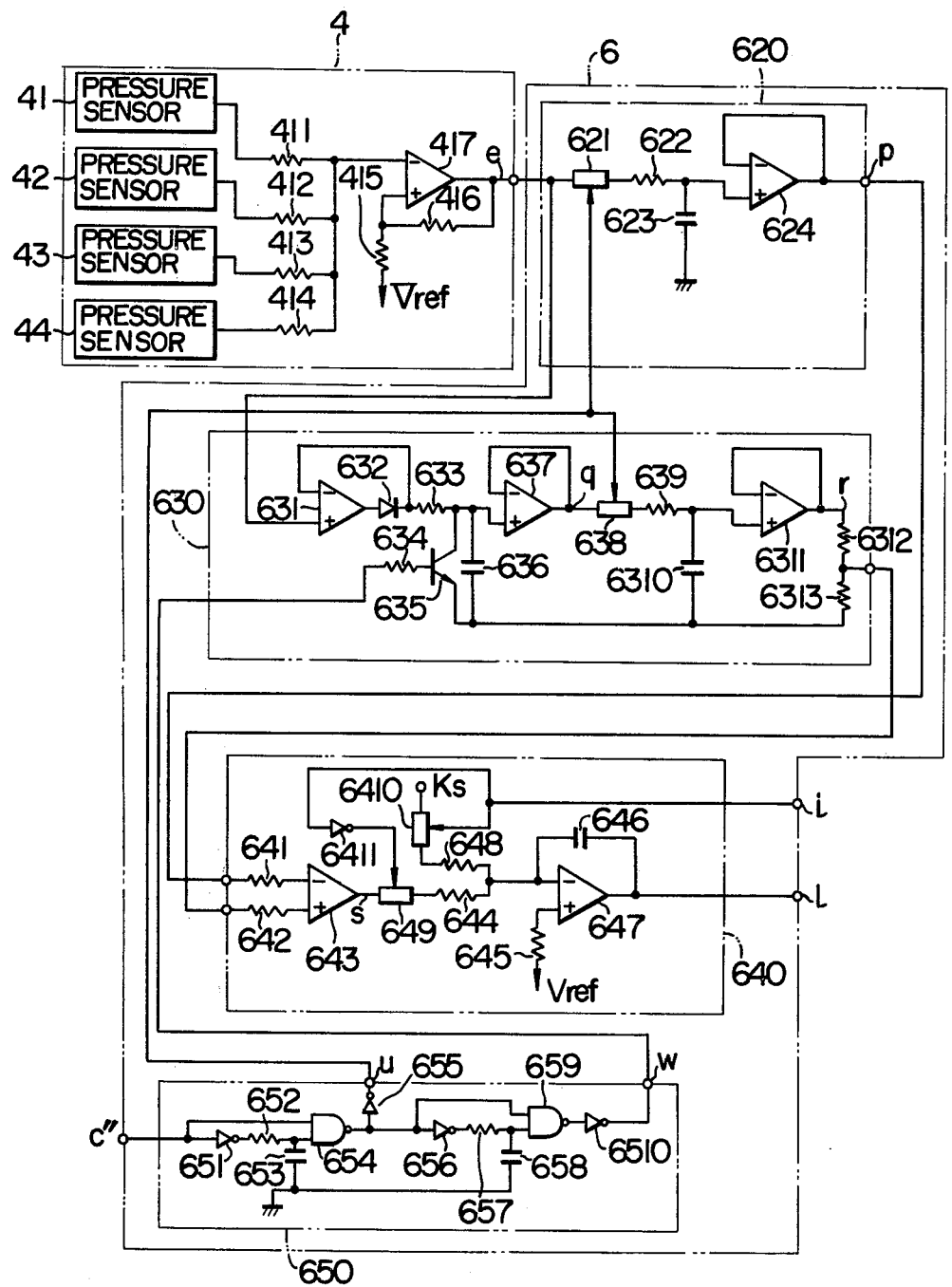
Figure 12:
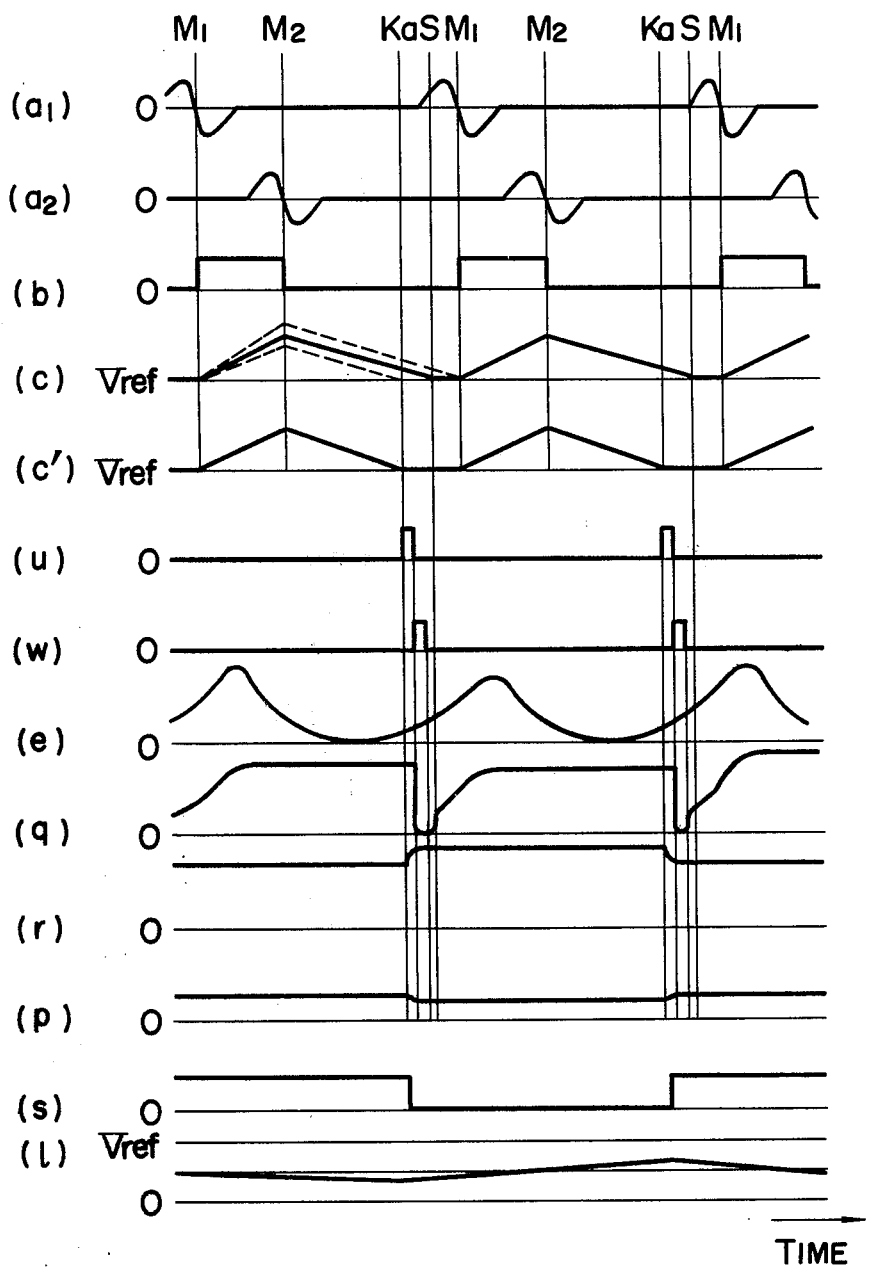
FIG. 12 is a time chart showing waveforms which are useful in explaining the operation of the second embodiment shown in FIGS. 9, 10 and 11.

In FIG. 10 showing in detail the construction of the angular position detector 1, the discharge control circuit 22 of the ignition timing computer circuit 2 and the charge control circuit 71 and the discharge control circuit 72 of the fixed angle computer circuit 7, the angular position detector 1 is identical in construction with the counterpart in the first embodiment shown in FIG. 3, and it generates the signals shown in (a$_1$), (a$_2$) and (b) of FIG. 12. The discharge control circuit 22 comprises resistors 2011 and 2012 and it generates at its output X a fixed potential which is higher than the reference potential Vref. The charge control circuit 71 comprises resistors 7011 and 7012 and it generates at its output Y a fixed potential which is lower than the reference potential Vref. The discharge control circuit 72 comprises resistors 7021 and 7022 and it generates as its output Z a potential which is higher than the reference potential Vref. The pressure detector 4 comprises pressure sensors 41, 42, 43 and 44 which are mounted in the respective cylinders, and the output potential of each sensor increases with increase in the cylinder pressure. The pressure sensors 41, 42, 43 and 44 are connected at an adder circuit comprising resistors 411, 412, 413, 414, 415 and 416 and an operational amplifier 417.

The advance/retard control circuit 6 comprises a fixed angle pressure value detection circuit 620, a maximum pressure value detection circuit 630, a charge control circuit 640 and a monostable multivibrator circuit 650. The fixed angle pressure value detection circuit 620 is of the hold circuit construction comprising an analog switch 621, a resistor 622, a capacitor 623 and an operational amplifier 624, and it holds the value Pi of the pressure waveform at the fixed angle Ka each time as shown in (P) of FIG. 12. The maximum pressure value detection circuit 630 comprises a peak detector circuit including operational amplifiers 631 and 637, a diode 632, resistors 633 and 634, a transistor 635 and a capacitor 636, and a hold circuit including an analog switch 638, a resistor 639, a capacitor 6310 and an operational amplifier 6311, and the output signal of the pressure detector 4 is applied to the peak detector circuit so that the peak value of the input is detected by the operational amplifier 631 and the diode 632 and it is then stored in the capacitor 636 by way of the resistor 633. On the other hand, the charge in the capacitor 636 is each time cancelled by the monostable output shown in (w) of FIG. 12 through the resistor 634 and the transistor 635, and the output shown in (q) of FIG. 12 is produced by the operational amplifier or voltage follower circuit 637 and is used by the hold circuit to derive the peak value of the pressure waveform shown in (r) of FIG. 12 in response to the monostable output shown in (u) of FIG. 12. The resulting output or the maximum value Pmax of each cylinder pressure is divided by two resistors 6312 and 6313, and the output of the maximum pressure detection circuit 630 becomes Pmax/m (m > 1). The charge control circuit 640 comprises a comparison circuit including resistors 641 and 642 and an operational amplifier 643, an integrator circuit including resistors 644, 645 and 648, a capacitor 646 and an operational amplifier 647, and a switching circuit including analog switches 649 and 6410 and a NOT circuit 6411, and it receives the output Pi of the fixed angle pressure value detection circuit 620, the output Pmax/m of the maximum pressure value detection circuit 630 and the output i of the knock detection circuit 5 that will be described later.

When the output of the knock detection circuit 5 goes to the "0" level, the analog switch 6410 is turned off and the analog switch 649 is turned on, thus applying the output s of the comparison circuit to the integrator circuit. Thus, when the value of Pmax/m is higher than Pi, the comparison circuit generates as its output s a "1" level signal as shown in (s) of FIG. 12 and consequently the integrator circuit causes the potential of the output l of the charge control circuit 640 to decrease with a negative going slope as shown in (l) of FIG. 12, whereas when the value of Pmax/m is lower than Pi, the comparison circuit generates as its output s a "0" level signal and consequently the potential of the output l of the charge control circuit 640 increases with a positive going slope as shown in (l) of FIG. 12. On the contrary, when the output i of the knock control circuit 5 goes to the "1" level, the analog switch 649 is turned off and the analog switch 6410 is turned on, so that the output at the supply terminal KS is applied to the integrator circuit and the output l of the charge control circuit 640 is decreased by the integrator circuit irrespective of the output s of the comparison circuit. The charge control circuit 640 has its output terminal l connected to one input terminal of the analog switch 23 in the ignition timing computer circuit 2 shown in FIG. 9. The monostable multivibrator circuit 650 is connected to the output c″ of the fixed angle computer circuit 7, and it is so designed that the output shown in (u) of FIG. 12 is generated by a first monostable multivibrator including NOT circuits 651 and 655, a NAND circuit 654, a resistor 652 and a capacitor 653 and the output shown in (w) of FIG. 12 is generated by a second monostable multivibrator including NOT circuits 656 and 6510, a NAND circuit 659, a resistor 657 and a capacitor 658.

Figure 4:
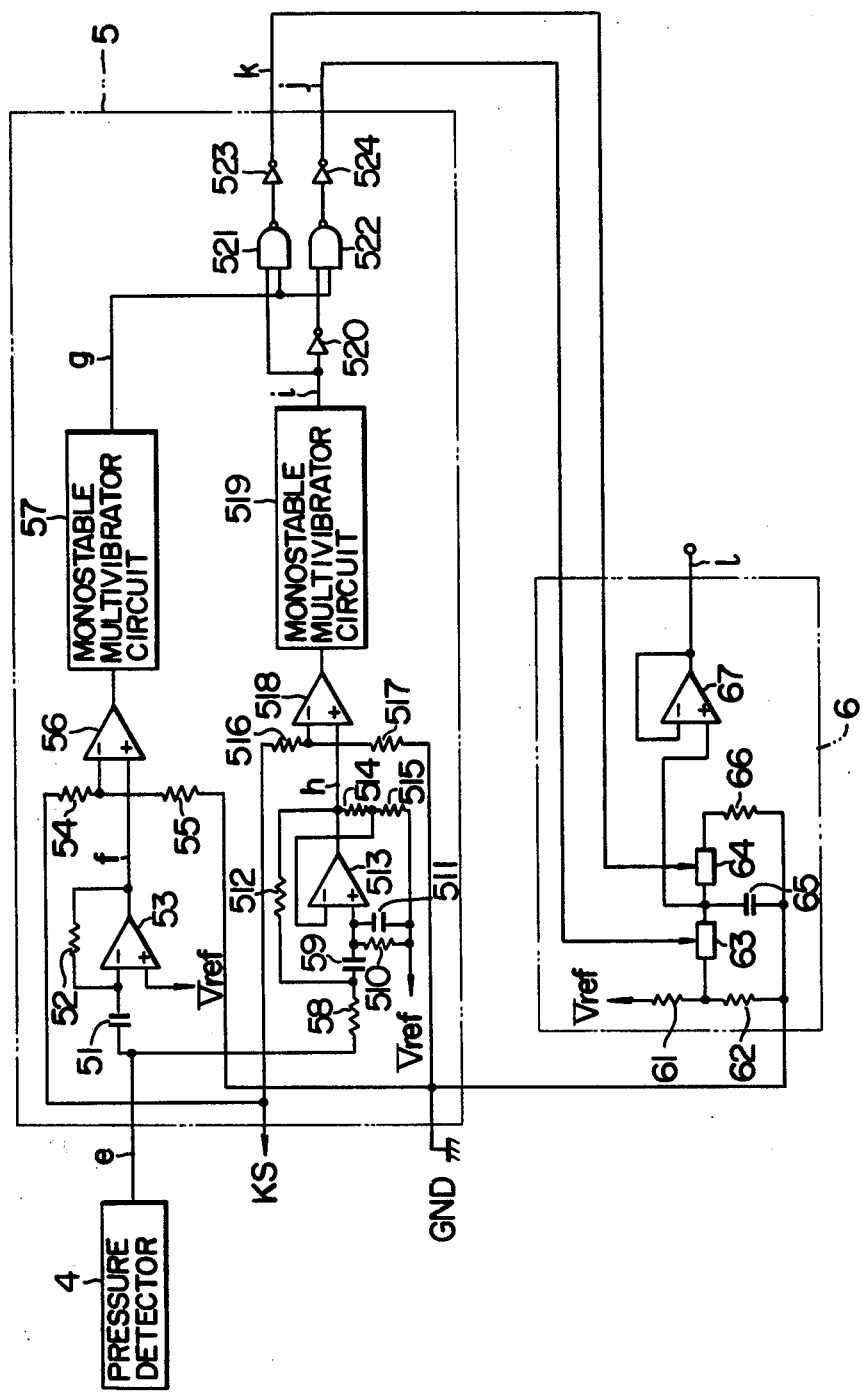
FIG. 4 is a wiring diagram showing a detailed construction of another part of the first embodiment shown in FIG. 2.
Figure 13:
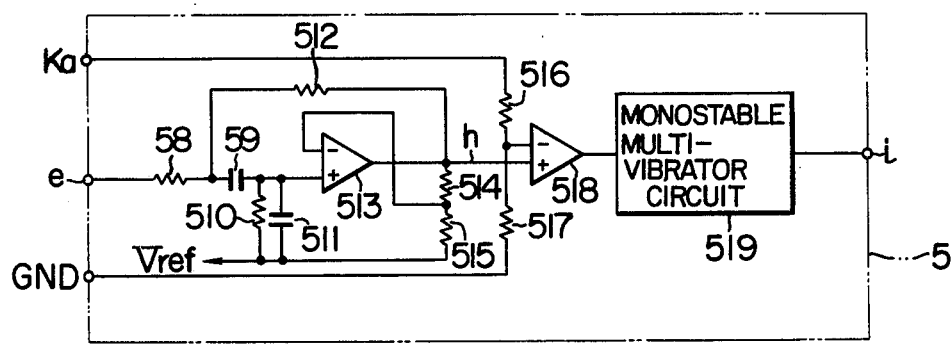
FIG. 13 is a wiring diagram showing a detailed construction of the knock detection circuit used in the second embodiment shown in FIG. 8.

FIG. 13 illustrates the knock detection circuit 5 which is simplified as compared with the counterpart in the first embodiment shown in FIG. 4. The knock detection circuit 5 comprises a band-pass filter including resistors 58, 510, 512, 514 and 515, capacitors 59 and 511 and an operational amplifier 513, a comparator including resistors 516 and 517 and an operational amplifier 518, and a monostable multivibrator circuit 519, whereby when knocking occurs so that a high frequency component of 5 to 10 KHz is superposed on the cylinder pressure as shown in (e) of FIG. 14, this high frequency component is detected by the bandpass filter as shown in (h) of FIG. 14 so that the comparator generates a signal which goes from the "0" level to the "1" level when the high frequency component exceeds a predetermined level, and this "1" level signal actuates the monostable multivibrator circuit 519 which in turn generates a pulse of a monostable time width $\tau_2$ as shown in (i) of FIG. 14.

The operation of the above-described second embodiment will now be described with reference to the time charts shown in FIGS. 12 and 14. The angular position detector 1 which is designed to generate rectangular pulses in synchronism with the rotation of the engine crankshaft that is not shown, generates at its output terminal b an output which goes to the "1" level during the time interval $M_1$ to $M_2$ and which goes to the "0" level during the time interval $M_2$ to $M_1$ as shown in (b) of FIG. 12, and the output generated consists of two pulses, two periods per revolution of the engine. When the output of the angular position detector 1 goes to the "1" level, the analog switch 23 of the ignition timing computer circuit 2 is turned on. At this time, the output of the NOT circuit 21 goes to the "0" level thus causing the analaog switch 24 to be turned off, and also the output signal of the AND circuit 214 goes to the "0" level thus turning off the capacitor resetting analog switch 29. Consequently, starting at the point of $M_1$, the capacitor 210 is charged from the reference potential Vref as shown in (c) of FIG. 12 in response to the output l of the advance/retard control circuit 6. This charging of the capacitor 210 causes the output of the operational amplifier 28 to become higher than the reference potential Vref, and thus the output of the comparision circuit goes to the "0" level.

Then, as the signal at the output terminal b of the angular position detector 1 goes to the "0" level at the point of $M_2$, the analog switch 23 is turned off and also the analog switch 24 is turned on, thus causing the capacitor 210 to start discharging at the predetermined discharge current caused by the fixed potential of the discharge control circuit 22. When the discharge of the capacitor 210 is completed so that the output of the operational amplifier 28 becomes lower than the reference potential Vref, the output of the comparison circuit changes to the "1" level and the output of the AND circuit 214 goes to the "1" level, thus holding the output of the operational amplifier 28 at the reference potential Vref as shown in (c) of FIG. 12. The resulting signal at the output terminal d of the ignition timing computer circuit 2 is applied to the ignition circuit 3, and consequently the ignition circuit 3 generates an ignition spark at a point S at which the discharge of the capacitor 210 terminates.

Now referring to the fixed angle computer circuit 7, it is substantially identical in construction with the ignition timing computer circuit 2 and there is no difference in the computing methods of the two circuits in that in the fixed angle computer circuit 7 the capacitor 710 charges during the time interval $M_1$ to $M_2$ and it discharges during the time interval $M_2$ to $M_1$ as shown in (c') of FIG. 12. Since the output potentials Y and Z of the charge control circuit 71 and the discharge control circuit 72 are fixed, both the charge current and discharge current are constant, and consequently a fixed angle position signal is always generated at the output terminal c" each time the predetermined fixed angle position Ka is reached, irrespective of the engine speed.

On the other hand, the advance/retard control circuit 6 produces the monostable outputs shown in (u) and (w) of FIG. 12, so that each time the fixed angular position Ka of the crankshaft is reached for each cylinder, in response to the monostable output u the preceding values of Pi and Pmax/m are detected and then held by the fixed angle pressure value detection circuit 620 and the maximum pressure detection circuit 630, and they are compared in the charge control circuit 640. When there is no knocking, the output i of the knock detection circuit 5 goes to the "0" level as shown in (i) of FIG. 14 so that the analog switch 649 is turned on and the analog switch 6410 is turned off. Consequently, when the value of Pmax/m is higher than Pi, namely, when the value of Pmax/m is higher than the predetermined value m, the potential of the output l decreases, whereas when the value of Pmax/Pi is lower than the predetermined value m the potential of the output l increases. As a result, if the ignition timing is on the retard side in relation to MBT, by virtue of the fact that Pmax/Pi is lower than the predetermined value m, the output l of the charge control circuit 640 increases and the charging current decreases, thus advancing the ignition timing due to the discharge current being constant. On the contrary, if the ignition timing is on the advance side in relation to MBT, by virtue of the fact that the value of Pmax/Pi becomes higher than the predetermined value m, the output l of the charge control circuit 640 decreases and the charge current increases, thus retarding the ignition timing. In this way, depending on whether the preceeding value of Pmax/Pi is higher or lower than the predetermined value m, the ignition timing is controlled to retard or advance it and thereby to cause the value of Pmax/Pi to approach the predetermined value m, and thus the ignition is timed to always occur at MBT so far as there is no knocking.

Figure 14:
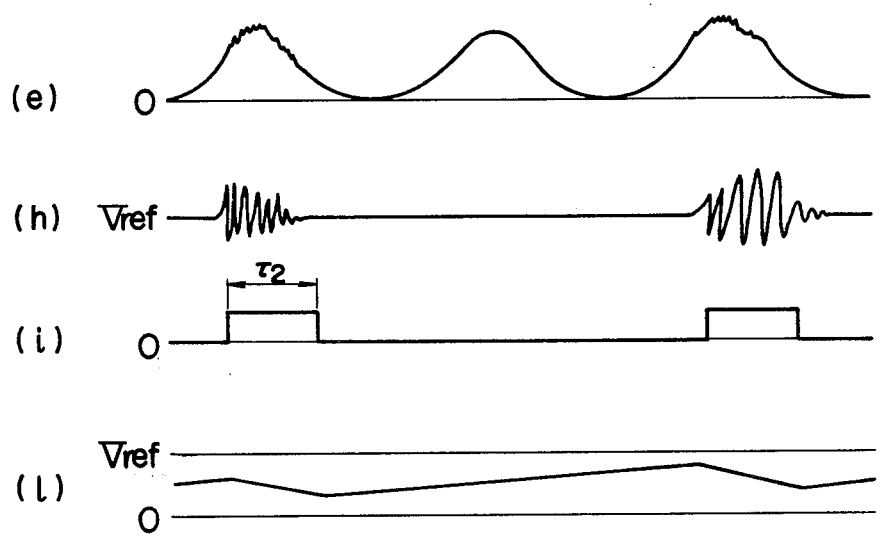
FIG. 14 is a time chart showing waveforms which are useful in explaining the operation of the knock detection circuit shown in FIG. 13.

On the other hand, when knocking occurs with the engine in operation, the knock detection circuit 5 generates as its output i a pulse of a monostable time width $\tau_2$ as shown in (i) of FIG. 14, so that the analog switch 649 is turned off and the analog switch 6410 is turned on in the charge control circuit 640. Consequently, irrespective of the value of Pmax/Pi, the output l of the charge control circuit 640 decreases as shown in (l) of FIG. 14 and the next ignition timing is controlled to a retard side. After the knocking has been detected thus controlling the ignition timing to the retard side, if no knocking occurs in the following cylinder, again the analog switch 649 is turned on and the analog switch 6410 is turned off. Since, at this time, the ignition timing is on the retard side in retation to MBT, the value of Pmax/Pi is lower than the predetermined value m and consequently the ignition timing is shifted to an advance side. In this way, under the knocking engine operating conditions, the ignition timing is controlled at around the limit at which knocking occurs. In this case, the level of the knocking limit is determined by the dividing point of the resistors 516 and 517 in the knock detection circuit 5.

Figure 15:
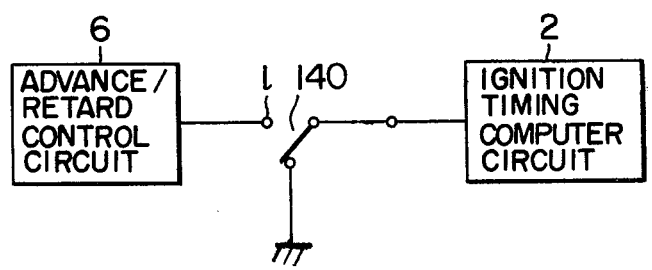
FIG. 15 is a block diagram showing a modification for the second embodiment shown in FIG. 8.

While, in the embodiment described above, there has been no description of the ignition timing control during starting and idling operations, in consideration of the actual engine operating conditions, it is possible to arrange as shown in FIG. 15 so that during starting and idling operations the input to the ignition timing computer circuit 2 is forcibly reduced to 0 by a switch 140 so that the charge current is increased to the maximum and the ignition timing is set at the maximum retard angle to effect the ignition, and the output of the advance/retard control circuit 6 is applied to the ignition timing computer circuit 2 only during other engine operations. Still further, while, in the embodiment described above, the reference angle Ka is detected by computing the charging and discharging of the capacitor, a third angular position sensor may be provided to detect the reference angle Ka.

What is claimed is:

1. An ignition system for internal combustion engines comprising:
    an angular position detector for detecting a predetermined angular position of an engine to produce an angular position signal;
    a pressure detector for detecting pressures in a cylinder of said engine to produce a pressure signal varying with said pressures;
    a knock detection circuit, connected to said pressure detector and including filter means, for producing a knock signal when said filter means, receiving said pressure signal, produces an output signal having frequencies much higher than that of said pressure signal equal to the rotational speed of said engine;
    an advance/retard control circuit connected to said knock detection circuit, for increasing and decreasing a retard angle quantity in accordance with the presence and absence of said knock signal;
    an ignition timing computer circuit, connected to said angular position detector, said knock detection circuit and said advance/retard control circuit, for starting computation of an ignition timing of said engine in response to said angular position signal and determining said ignition timing depending on an ignition timing pattern preset in accordance with operating conditions of said engine, said ignition timing computer circuit retarding said ignition timing computed depending on said ignition timing pattern in proportion to the retard angle quantity determined by said advance/retard control circuit to thereby prevent the knock of said engine;
    wherein said ignition timing computer circuit includes:
    a capacitor;
    charging means for charging said capacitor during a predetermined rotational angles of said engine in response to said angular position signal;
    discharging means, for discharging said capacitor after the termination of charging said capacitor to determine said ignition timing at the completion of discharging said capacitor; and
    current control means for controlling the current for either charging or discharging said capacitor in response to an output of said advance/retard control circuit to thereby retard said ignition timing; and wherein said advance/retard control circuit includes:
    another capacitor and resistors; and
    charge/discharge control means for charging and discharging through said resistors said another capacitor in accordance with absence and presence of said knock signal.

2. An ignition system for internal combustion engines comprising:
    an angular position detector for detecting a predetermined angular position of an engine to produce an angular position signal;
    a pressure detector for detecting pressures in a cylinder of said engine to produce a pressure signal varying with said pressures;
    a knock detection circuit, connected to said pressure detector and including filter means, for producing a knock signal when said filter means, receiving said pressure signal, produces an output signal having frequencies much higher than that of said pressure signal equal to the rotational speed of said engine;
    an ignition timing computer circuit, connected to said angular position detector and to said knock detection circuit, for starting computation of an ignition timing of said engine in response to said angular position signal and determining said ignition timing depending on an ignition timing pattern preset in accordance with operating conditions of said engine, said ignition timing computer circuit retarding said computed ignition timing depending on said ignition timing pattern in response to said knock signal to thereby prevent the knock of said engine; and further including
    a fixed angle computer circuit connected to said angular position detector, for determining a predetermined reference angular position of said engine based on said angular position signal;
    reference pressure memory means, connected to said pressure detector and said fixed angle computer circuit, for memorizing the pressure detected by said pressure detector at said reference angular position;
    a maximum pressure memory means, connected to said pressure detector, for memorizing the maximum pressure detected by said pressure detector; and
    ignition timing pattern setting means for presetting said ignition timing pattern in accordance with two pressures memorized by said two memory means so that the ratio between said two pressures is kept at a constant value.

* * * * *